Dec. 6, 1932.   G. FLINTERMANN   1,890,048
ADJUSTABLE SEAT
Filed Sept. 12, 1929   4 Sheets-Sheet 1
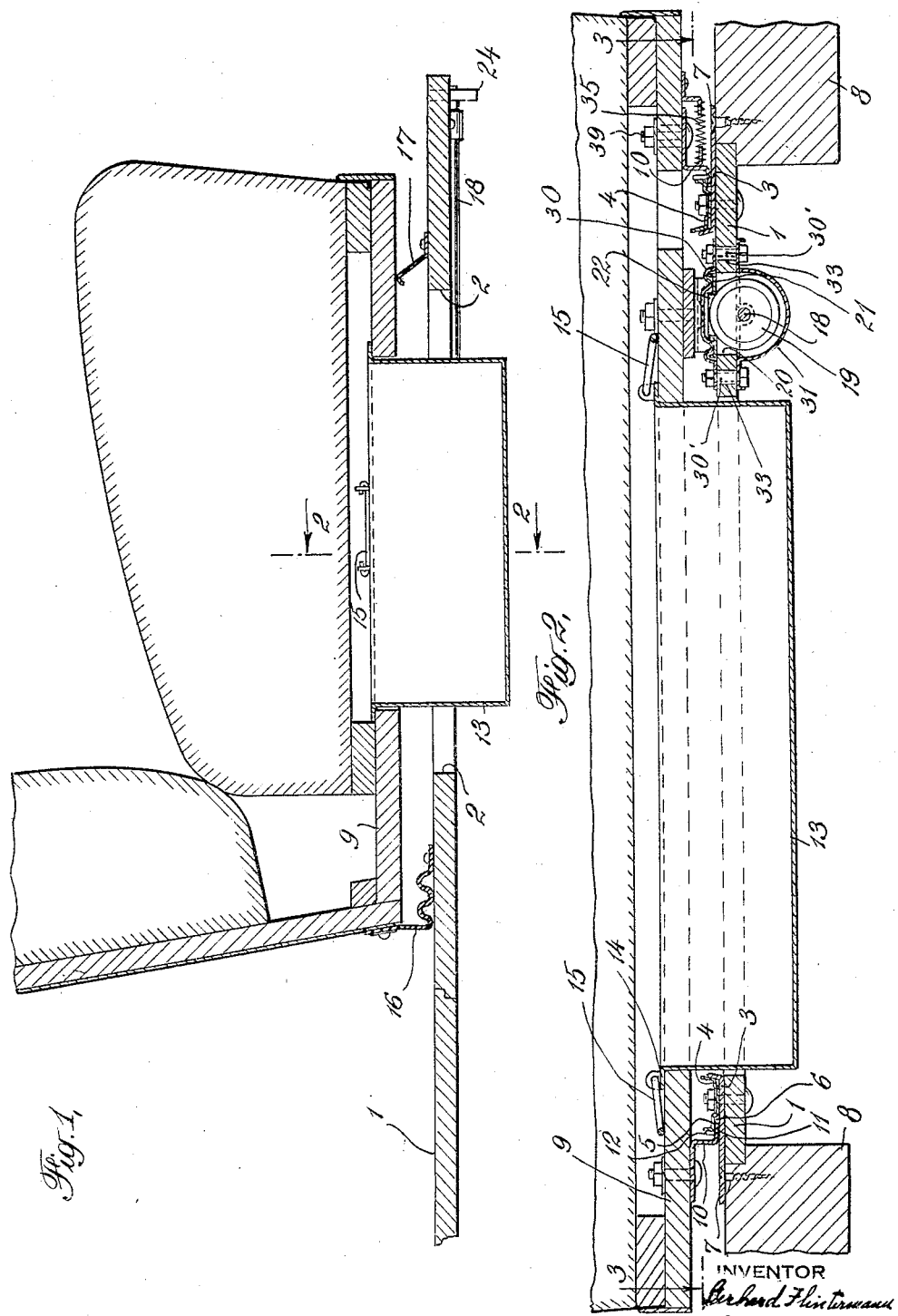
INVENTOR
Gerhard Flintermann
BY
ATTORNEY

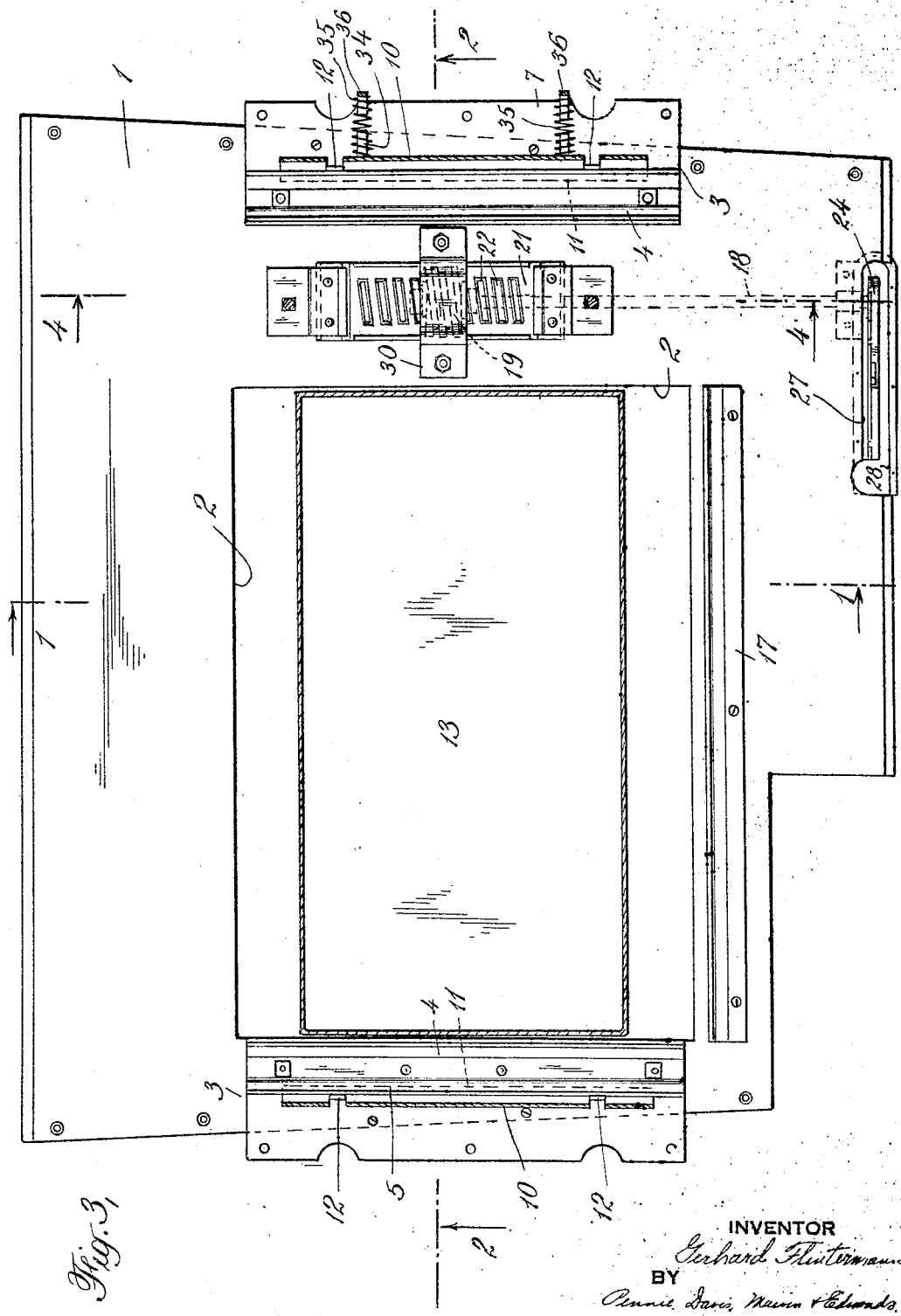

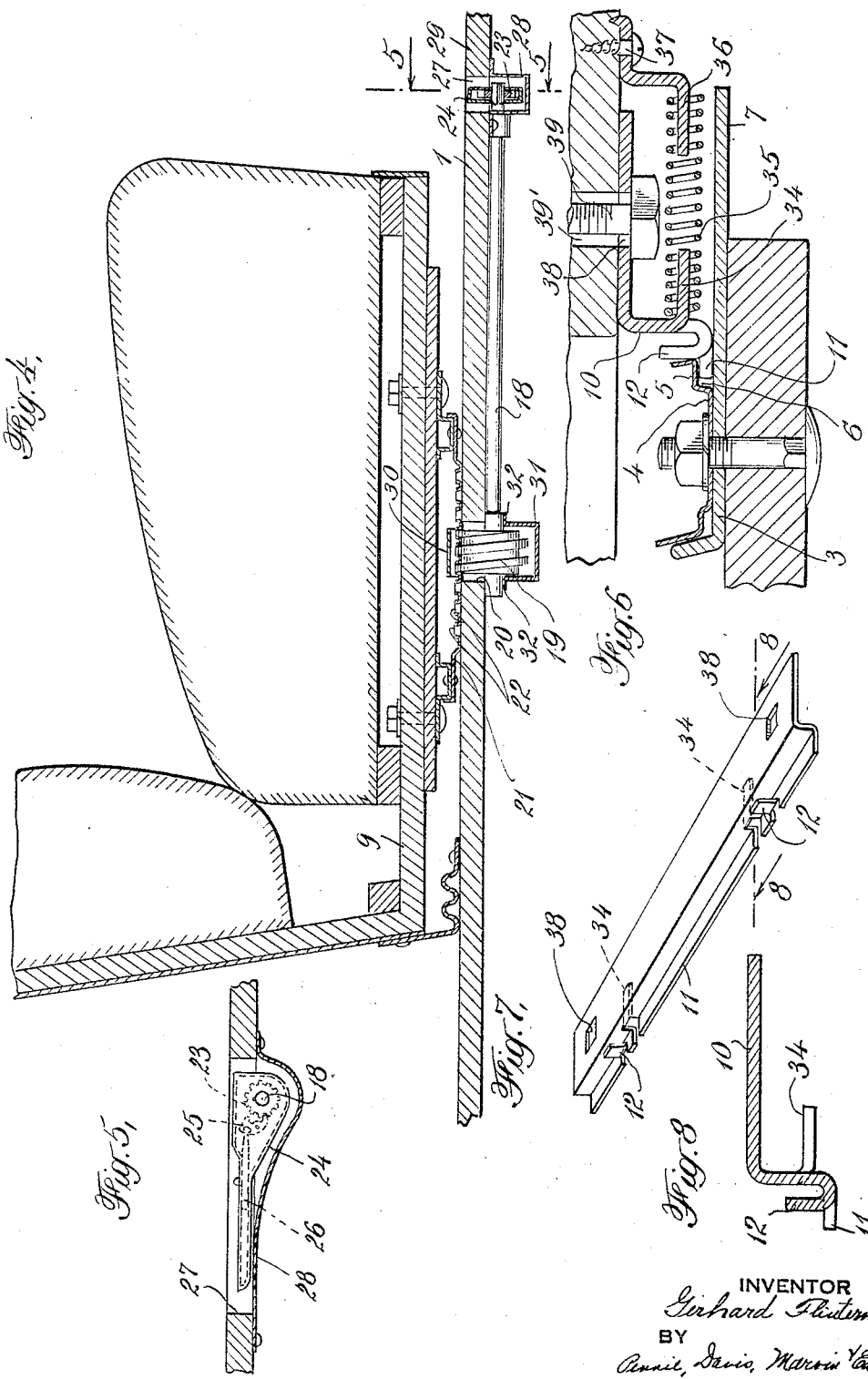

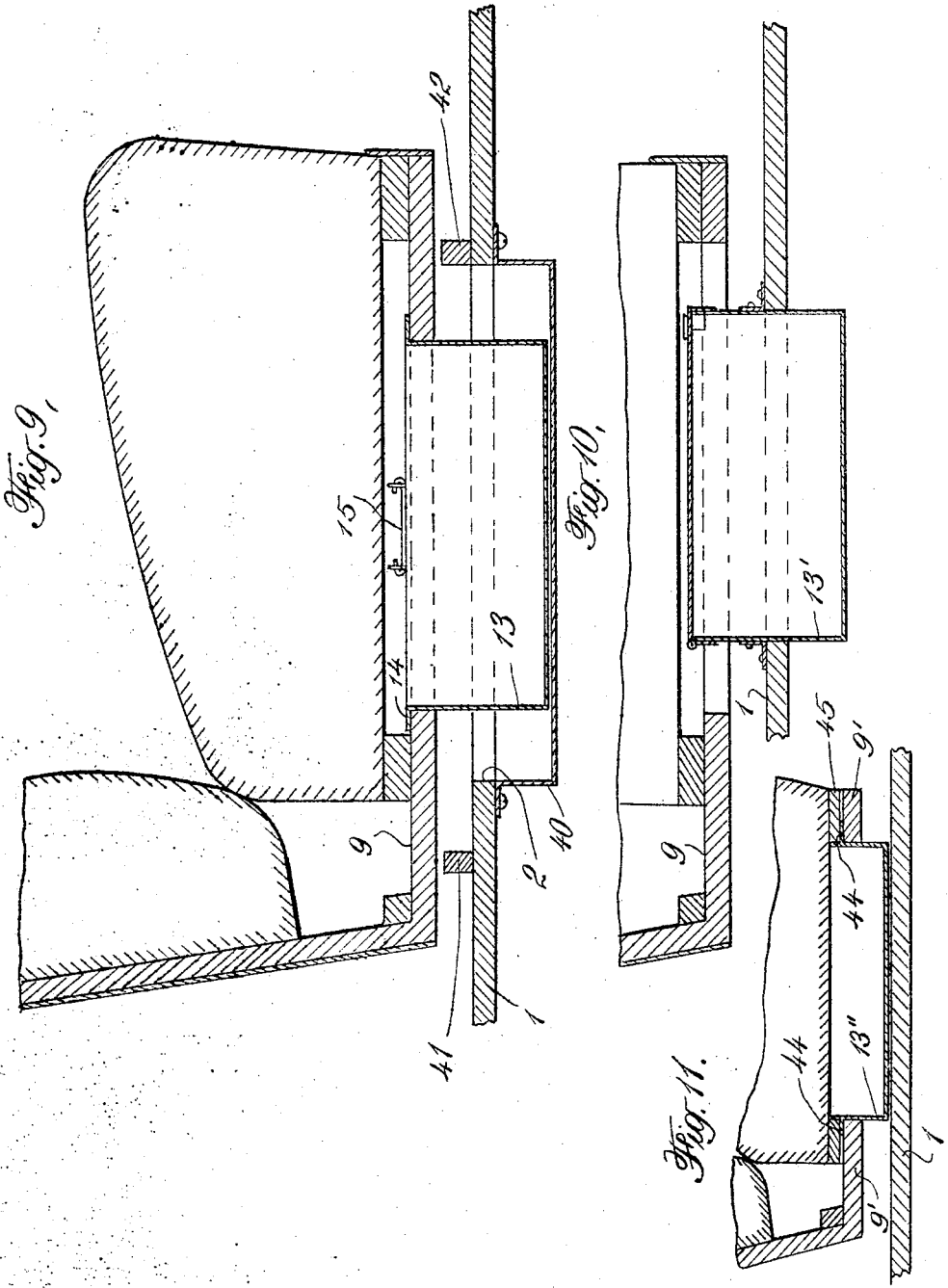

Patented Dec. 6, 1932

1,890,048

UNITED STATES PATENT OFFICE

GERHARD FLINTERMANN, OF WEST ORANGE, NEW JERSEY

ADJUSTABLE SEAT

Application filed September 12, 1929. Serial No. 392,112.

This invention relates to adjustable seats for automobiles.

The adjusting mechanism for automobile seats now in use is not well adapted for use with a seat under which it is desired to place a box or receptacle for sundry tools or other articles. Unless the articles are carefully positioned in the receptacle they are likely to interfere with the operation of the adjusting mechanism or the movement of the seat. The principal object of this invention is to provide adjusting mechanism especially designed for use with that kind of a seat under which a receptacle for tools or other articles is placed, the parts being so constructed and related that neither the presence of the receptacle or the articles therein interfere with the operation of the adjusting operation or the movement of the seat. A further object of the invention is to improve the details of the adjusting mechanism so as to make it meet practical conditions and so that it will operate in a fool-proof and easy manner.

The invention is illustrated in the accompanying drawings in which

Fig. 1 is a vertical section through the improved adjustable seat taken longitudinally of the automobile, the section being taken on line 1—1 of Fig. 3;

Fig. 2 is a vertical section taken transversely of the automobile, the section being taken on the line 2—2 of Fig. 3;

Fig. 3 is a horizontal section taken on the line 3—3 of Fig. 2;

Fig. 4 is a vertical section taken on the line 4—4 of Fig. 3;

Fig. 5 is a transverse section taken on the line 5—5 of Fig. 4 illustrating the construction of the ratchet lever;

Fig. 6 is a detail vertical section of one of the seat slides;

Fig. 7 is a perspective view of the seat slide shown in Fig. 6;

Fig. 8 is a transverse section of the seat slide taken on the line 8—8 of Fig. 7;

Fig. 9 is a vertical section taken longitudinally of the automobile showing a modification of one of the details, and Figs. 10 and 11 are vertical sections taken longitudinally of the automobile, showing modified ways of mounting the tool box.

The particular adjustable seat illustrated in Figs. 1 to 8 of the drawings comprises a base 1 which is preferably of such size and shape that it, together with certain parts mounted on it, can be positioned in the automobile and form a part of the flooring thereof. The base 1 has an opening 2 substantially rectangular in shape as best shown in Fig. 3. Secured to the base 1, along the left-hand lateral edge of the opening 2 (Fig. 2) is a left-hand guide made up of a lower plate or strip 3 and a superposed strip 4. The outer edge portion of the strip 4 is offset as shown at 5 (Fig. 2) to form a groove 6 between the lower plate 3 and the upper plate 4 to receive an edge portion of one of the seat slides as hereinafter described. The lower plate 3 is extended in a direction transversely of the automobile beyond the edge of the base 1, as shown at 7 (Fig. 2) in order that it may be bolted or screwed to the car sill 8. A right-hand guide similarly formed is secured to the base 1 on the opposite side of the opening 2 but it will be noticed that this guide is located a distance from the corresponding edge of the opening 2 in the base in order to leave room for the actuating mechanism to be hereinafter described. The lower plate 3 of this right hand guide is also extended outwardly beyond the edge of the base 1 in order that it may be screwed or bolted to the corresponding automobile sill 8. The attachment of the extensions 7 of the lower guide plates 3 to the sills 8 secures the base 1 in position and prevents upward tilting movement of it when the occupant of the seat exerts pressure on the back of the seat.

Bolted to the under surface of the seat frame 9 is a left-hand slide 10 having a horizontal flange 11 arranged to slide in the groove 6 of the left-hand guide. A pair of lugs 12 are struck up from the flange 11 and are spaced apart longitudinally of the slide as shown in Fig. 3. These make contact with the outer edge of the upper guide plate 5. The corresponding right-hand guide is constructed in a similar manner except that it is spring pressed toward the corresponding guide for the purpose to be hereinafter described. The lugs 12 on the two slides prevent the flanges 11 from projecting too far into the corresponding groove 6, and they guide the seat with a minimum amount of friction and without binding.

The seat frame 9 has an opening large enough to receive a tool box 13. The tool box is preferably supported in a removable manner in the seat frame 9 and this may be accomplished by providing the upper edge of the tool box with a horizontal flange 14 which overlaps the edge of the opening in the seat frame. The tool box may be provided with handles 15 by which it may be lifted out of the seat frame. When the seat frame is adjusted in forward or backward direction the tool box moves with it. The opening 2 in the base 1 is therefore made large enough to allow for the maximum movement of the tool box. A strip of flexible material 16 such as fabric or the like may be secured to the lower rear edge of the seat and to the base 1 to prevent air or gases from passing upwardly through the opening 2 in the base and into the interior of the automobile. This strip of flexible material will also prevent articles which happen to be on the floor of the automobile from falling through the opening. When the seat is in the forward position the flexible material should have sufficient fullness to allow the seat to move to its rear position. For a similar purpose a strip of suitable material 17 closes the gap between the forward edge of the opening 2 and the front edge of the seat. The strip 17 is preferably made of thin sheet metal and may be secured to the base 1 as shown in Fig. 1. It is constructed and operates in substantially the same way as a piece of metal weatherstripping. A similar strip could be used in place of the fabric 16 or a strip of fabric like that shown at 16 could be used in place of the metal strip 17.

The mechanism for actuating the seat comprises a worm shaft 18 journalled under the base 1. At its rear end the shaft 18 carries a worm 19 which projects upwardly through an opening 20 in the base 1. Secured to the under surface of the seat frame 9 is a strip of metal 21 provided with rack teeth which are preferably formed by pressing or stamping transverse openings 22 in it. The teeth on the worm 19 engage in the transverse openings 22 of the rack and when the worm is rotated it will move the seat frame back and forth.

The forward end of the shaft 18 carries a ratchet wheel 23 (Fig. 5). A hollow lever 24 is mounted to oscillate about the shaft 18. In the lever 24 is a reversible pawl 25 which may be reversed by sliding a bar 26 longitudinally within the hollow lever. The details of the lever and the ratchet mechanism are disclosed more fully in my co-pending application Serial No. 361,403 filed May 8, 1929. The base 1 has an opening 27 to accommodate the ratchet lever 24. The seat is adjusted by oscillating the ratchet lever 24 back and forth through a sector of a circle extending above the level of the floor. When the pawl 25 is in one of its positions the shaft 18 will be rotated in one direction to adjust the seat one way and when the pawl is in its other position the shaft 18 will be rotated in the opposite direction to adjust the seat the other way. A sheet metal housing 28 may be placed below the ratchet lever to protect it and this housing may be secured to the edge of the base 1 and to the adjacent edge of the automobile flooring 29.

The rack 21 is restrained against movement away from the worm by a restraining guide or strap 30 (Fig. 3), which is bolted to the upper surface of the base 1 and projects transversely across the rack 21. The strap 30 is so shaped that it makes contact with the rack along the lateral edge thereof as shown in Fig. 2. The bolts 30' which secure the restraining strip 30 in place also serve to secure to the under surface of the base 1 a housing 31 for the worm 19. This housing has suitable bearings 32 in which the shaft 18 is journalled. If the restraining strip 30 were bolted down too tight it might interfere with the free movement of the rack 21. In order to prevent this the bolts 30' pass through spacers 33 which are of such a height that the bolts may be securely tightened without causing the restraining strip 30 to exert a binding pressure on the rack 21.

It was stated above that the right hand seat slide was similar to the left hand one except for the fact that it is spring pressed toward the corresponding guide. The construction of the right hand slide is best shown in Figs. 6, 7 and 8. It is similar in all respects to the right hand slide except that it has a pair of outwardly extending lugs 34 struck up from the edge portion of the slide as shown in Fig. 7 in such a way that each of these lugs may extend into one end of a coil spring 35. The other end of each coil spring fits over the projecting end 36 of a metal strip secured to the under surface of the seat frame 9 as shown in 37. The openings 38 by which the seat slide is bolted to the seat frame are larger than the bolts 39 which pass through them and the openings 39' in the seat frame are also preferably larger than the bolts 39. When the seat is assembled on the base 1 the edge 11 of the left hand slide is moved into the groove 6 of the left hand guide as far as it will go. The right hand slide is then pushed back against the springs 35 far enough to allow the edge 11 to slip down and into the corresponding groove 6 of the right hand guide, the play in the openings 38 and 39' permit this backward movement of the slide. The springs 35 then push the slide toward the guide until the lugs 12 make good contact with the edge of the upper guide plate 4. The bolts 39 are then tightened to secure the slide in place. The springs 35 act automatically to take up all play before the bolts 39 are tightened. They eliminate the human element so far as removing lateral play from the seat is concerned, which is a desirable thing because workmen assembling the seat cannot always be depended upon to see to it that the seat slides fit snugly against the guides.

In the modification of Fig. 9, the opening 2 in the base 1 is closed by a sheet metal housing 40 secured to the under surface of the base 1 and extending below the tool box 13. This housing answers the same purpose as the flexible strips 16 and 17 shown in Fig. 1 but in addition it is advisable to employ projecting strips 41 and 42 to at least partly close the space between the seat frame and the upper surface of the base 1 in order to prevent articles from dropping into the housing 40 and thereby interfering with the movement of the tool box 13.

In the modification of Fig. 10 the tool box is supported by the base 1 instead of by the seat frame 9. In this arrangement the seat frame moves relative to the tool box and, therefore, the width of the tool box measured lengthwise of the automobile should be less than the corresponding dimension shown in the other figures, in order that the opening in the seat frame into which the upper part of the tool box projects may allow sufficient movement of the seat. The seat frame shown in Fig. 10 may be adjustably mounted and actuated in the same manner as shown in the other figures.

In the modification of Fig. 11, the tool box 13'' is located entirely above the level of the base 1' which constitutes a part of the automobile flooring. In this case it is not necessary to provide the base 1 with an opening to accommodate the lower portion of the tool box. The tool box may be supported on the seat frame 9' in any suitable way, as by means of brackets 44. This arrangement tends to reduce the depth of the tool box because there is not much space between the seat and the base or flooring. However, the upper edge of the tool box can project above the seat frame 9' to furnish additional depth because the frame 45 of the seat cushion rests on the seat frame 9' and the upper edge of the tool box can project into the opening of the cushion frame as shown in Fig. 11. In practice the cushion frame 45 is usually made of wood about five-eighths of an inch thick, and, therefore, the upper edge of the tool box can project above the seat frame 9' approximately that distance. If desired, the opening in the cushion frame 45 may correspond in shape and size to the tool box so that when the cushion frame is slipped over the upper projecting edge of the tool box, the tool box itself will hold the cushion frame in position and no other means need be provided for this purpose.

While the box 13 has been referred to as a tool box it may be used as a compartment for carrying any article or articles.

It will now be seen that any articles placed in the compartment or box 13 are entirely separated from the parts of the adjusting mechanism and in no way interfere with their operation. All parts of the mechanism are located outside of the confines of the tool box and none of the mechanism is located above the tool box. One of the important things is that every part of the mechanism, between which and the tool box there is relative movement, lies somewhere other than above the tool box. Therefore tools in the box cannot come in contact with any part where there is relative movement between that part and the tools.

In spite of the fact that the space below the automobile seat is extremely limited, I have by properly designing and positioning the parts been successful in combining with an automobile seat both a box or compartment for carrying tools and the like and the necessary mechanism for adjusting the seat without any interference between the adjusting mechanism and the tools or other articles carried in the box.

I claim:

1. An adjustable seat for automobiles comprising a base, guide mechanism secured to said base, a seat frame, slide-mechanism for the seat frame, means for securing said slide-mechanism to the under surface of the seat frame, resilient means tending to force a portion of the slide-mechanism into engagement with the guide-mechanism, the means for securing said portion of the slide-mechanism to the seat frame permitting when loosened movement of said portion of the slide-mechanism toward and away from the guide-mechanism and when tightened serving to rigidly secure said portion of the slide-mechanism to the seat frame.

2. An adjustable seat for automobiles comprising a base, at least one guide mounted on the base, a seat frame, at least one slide associated with the seat frame for cooperation with said guide, said slide having limited movement toward and away from the guide, springs reacting against said slide and against fixed parts of the seat frame and tending to move the slide toward the guide, and means for securing the slide to the seat frame when said springs have pressed it fully into engagement with the slide.

3. An adjustable seat for automobiles comprising a base member, a seat frame member, guide mechanism secured to one of said members and slide mechanism secured to the other member, resilient means tending to force a portion of the mechanism on one of said members toward a portion of the mechanism on the other member and means for rigidly securing said portion of the mechanism to its corresponding member.

In testimony whereof I affix my signature.

GERHARD FLINTERMANN.